(12) United States Patent
Sun et al.

(10) Patent No.: US 9,311,354 B2
(45) Date of Patent: Apr. 12, 2016

(54) METHOD FOR TWO-STAGE QUERY OPTIMIZATION IN MASSIVELY PARALLEL PROCESSING DATABASE CLUSTERS

(71) Applicant: FutureWei Technologies, Inc., Plano, TX (US)

(72) Inventors: Jason Yang Sun, Palo Alto, CA (US); Qingqing Zhou, Santa Clara, CA (US); Mohan Singamshetty, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 119 days.

(21) Appl. No.: 13/730,872

(22) Filed: Dec. 29, 2012

(65) Prior Publication Data

US 2014/0188841 A1    Jul. 3, 2014

(51) Int. Cl.
*G06F 17/30* (2006.01)

(52) U.S. Cl.
CPC .... *G06F 17/30445* (2013.01); *G06F 17/30483* (2013.01)

(58) Field of Classification Search
CPC ............... G06F 17/30463; G06F 17/30516; G06F 17/30466; G06F 17/30442; G06F 17/30445; G06F 17/30477; G06F 17/30545; G06F 17/30; G06F 17/30424; G06F 17/30483; G06F 17/30864; G06F 17/30389; G06F 17/3047
USPC .......... 707/718, 714, E17.014, E17.017, 661, 707/713, 769, 770, E17.131, 693, 722, 737, 707/759, 805, 808, E17.001, E17.005, 707/E17.032, E17.045, E17.054, E17.089, 707/603, 607, 683, 715, 719, 723, 747, 748, 707/768, 792, 798, 802; 705/27.1, 2, 26.8, 705/26.9, 319, 36 R, 7.11, 7.15, 7.36; 709/213, 204, 206, 208, 223, 225, 231; 706/12, 46

See application file for complete search history.

(56) References Cited

U.S. PATENT DOCUMENTS

| | | | | |
|---|---|---|---|---|
| 4,769,772 | A | * | 9/1988 | Dwyer .......................... 707/714 |
| 5,584,018 | A | * | 12/1996 | Kamiyama ................... 711/165 |
| 5,943,666 | A | * | 8/1999 | Kleewein et al. |
| 6,092,062 | A | | 7/2000 | Lohman et al. |
| 6,526,403 | B1 | * | 2/2003 | Lin et al. |
| 7,739,269 | B2 | * | 6/2010 | Chaudhuri ........ G06F 17/30463 707/713 |

(Continued)

OTHER PUBLICATIONS

Global Query Processing and Optimization in the CORDS multidatabase system (Zhu et al., Proc. of 9th ISCA Int'l Conf on Parall. and Distr. Comput. System., Sep. 25-27, 1996).*

(Continued)

*Primary Examiner* — Jay Morrison
*Assistant Examiner* — Ken Hoang
(74) *Attorney, Agent, or Firm* — Slater & Matsil, L.L.P.

(57) ABSTRACT

Queries may be processed more efficiently in an massively parallel processing (MPP) database by locally optimizing the global execution plan. The global execution plan and a semantic tree may be provided to MPP data nodes by an MPP coordinator. The MPP data nodes may then use the global execution plan and the semantic tree to generate a local execution plan. Thereafter, the MPP data nodes may select either the global execution plan or the local execution plan is accordance with a cost evaluation.

21 Claims, 12 Drawing Sheets

(56) References Cited

U.S. PATENT DOCUMENTS

| | | |
|---|---|---|
| 2003/0212668 A1 | 11/2003 | Hinshaw et al. |
| 2005/0033818 A1* | 2/2005 | Jardin .......................... 709/213 |
| 2008/0120273 A1 | 5/2008 | Ramesh et al. |
| 2009/0198703 A1 | 8/2009 | Ezzat et al. |

OTHER PUBLICATIONS

Umeshwar Dayal—Query Processing in Multidatabase System, 1985.*

International Search Report received in Application No. PCT/CN2013/030788, mailed Apr. 3, 2014, 11 pages.

* cited by examiner

US 9,311,354 B2

METHOD FOR TWO-STAGE QUERY OPTIMIZATION IN MASSIVELY PARALLEL PROCESSING DATABASE CLUSTERS

TECHNICAL FIELD

The present disclosure relates to database systems and methods, and, in particular embodiments, to a method for two-stage query optimization in massively parallel processing database cluster.

BACKGROUND

Massively parallel processing (MPP) is the coordinated processing of a program by multiple processors, with each processor working on different parts of the program. The processors communicate with one another to complete a task, but otherwise rely on their own operating system and memory resources. MPP database systems are based on shared-nothing architectures, where the database is partitioned into segments and distributed to a plurality of processors (data nodes) for parallel processing. Because each data node stores only a portion of the MPP database concurrently, database operations (e.g., search, scan, etc.) are performed more quickly than would otherwise be possible in a sequential processing system.

Clients access information in MPP databases by interacting with an MPP coordinator, which is a process configured to receive and respond to queries. More specifically, for each issued query the MPP coordinator consults a global catalog to develop a single query plan (referred to herein as a 'global execution plan'), which is then distributed to each of the MPP data nodes for local execution. Notably, the MPP's coordinator's global view of resources and data distribution may lack knowledge of local configuration information and/or statistics local to the MPP data nodes, and, instead, may make generalized assumptions about, inter alia, local data distribution and/or resource availability. For instance, the MPP coordinator may assume that data is evenly distributed amongst the various MPP data nodes and/or that the MPP data nodes' resources (e.g., processing or otherwise) are unconstrained. As a result, the MPP coordinator's global execution plan may be sub-optimal for one or more of the local MPP data nodes, which may lead to inefficient execution of the global execution plan. Accordingly, mechanisms for improving query optimization in MPP database systems are desired.

SUMMARY

Technical advantages are generally achieved, by embodiments of the present disclosure which describe a method for two-stage query optimization in massively parallel processing database cluster.

In accordance with an embodiment, a method for processing queries in a massively parallel processing (MPP) database is provided. In this example, the method includes receiving, by an MPP data node, a global execution plan and a semantic tree from an MPP coordinator, generating, by the MPP data node, a local execution plan in accordance with the semantic tree; and selecting either the global execution plan or the local execution plan for execution by the MPP data node. An apparatus for performing this method is also provided.

In accordance with another embodiment, a massively parallel processing (MPP) database system is provided. In this example, the system comprises one or more MPP coordinators configured to receive a query from a client; generate a semantic tree, develop a global execution plan for executing the query in accordance with the semantic tree, and distribute the global execution plan to a plurality of MPP data nodes. The system further comprises an MPP data node configured to receive the global execution plan and the semantic tree from the one or more MPP coordinators, obtain an optimized execution plan by optimizing the global execution plan using the semantic tree in accordance with local configuration information of the first MPP data node, and execute the optimized execution plan.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims.

Aspects of this disclosure enable MPP data nodes to locally optimize global execution plans in accordance with their own configuration information. More specifically, an MPP data node will generate a local execution plan in accordance with a semantic tree provided by the MPP coordinator. The local execution plan may be tailored to local configuration information of the MPP data node (e.g., resource availability, amount and value/object distribution of locally stored data, etc.), which may be generally unavailable to the MPP coordinator. When generating the local execution plan, a sub-tree obtained from the semantic tree may be fortified using constraints associated with the global execution plan to ensure that each segment of the local execution plan satisfies those constraints.

Figure 1:
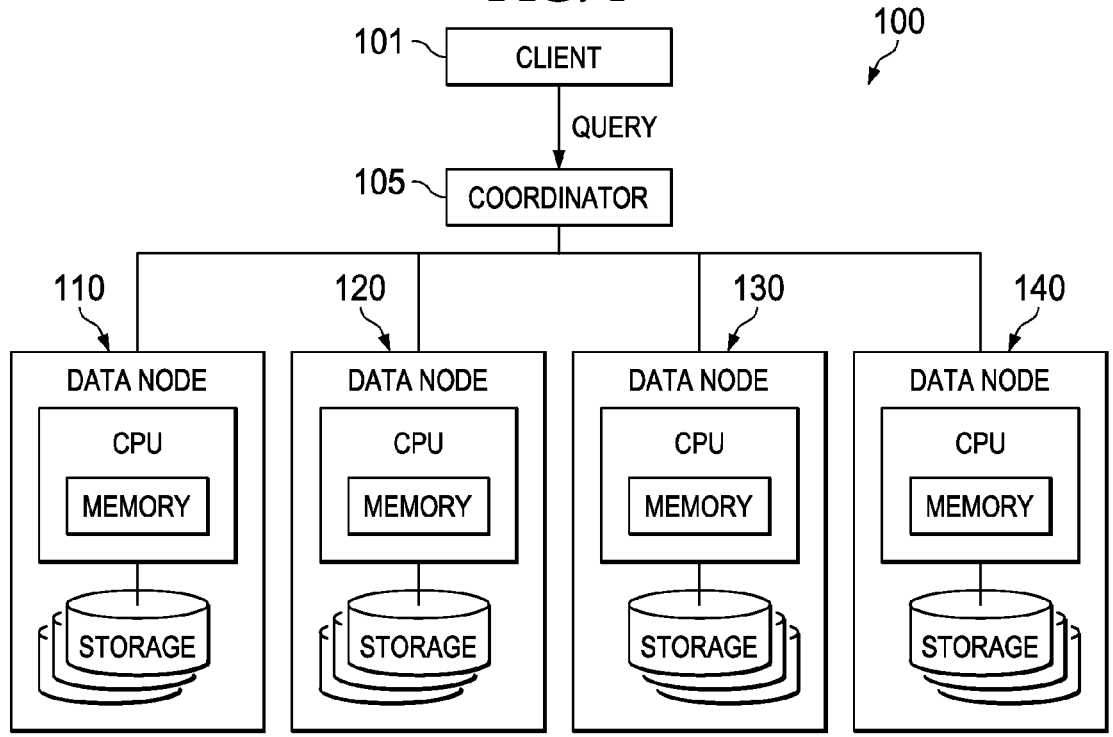
FIG. 1 illustrates a diagram of an embodiment MPP database system.

FIG. 1 illustrates an MPP database system 100 for processing queries of a client 101. As shown, the MPP database system 100 comprises a coordinator 105 commutatively coupled to a plurality of data nodes 110-140. The coordinator 105 may be any device configured to execute queries on behalf of the client 101. Executing such queries may involve developing a global execution plan including one or more local plan segments that outline processing flows for the data nodes 110-140. The data nodes 110-140 may be any components having access (e.g., exclusive access) to a partition of the MPP database system 100. The data nodes 110-140 may be configured to optimize the global execution plan and/or corresponding segments of the global execution plan, and thereafter to execute corresponding plan segments to produce a query result.

Figure 2:
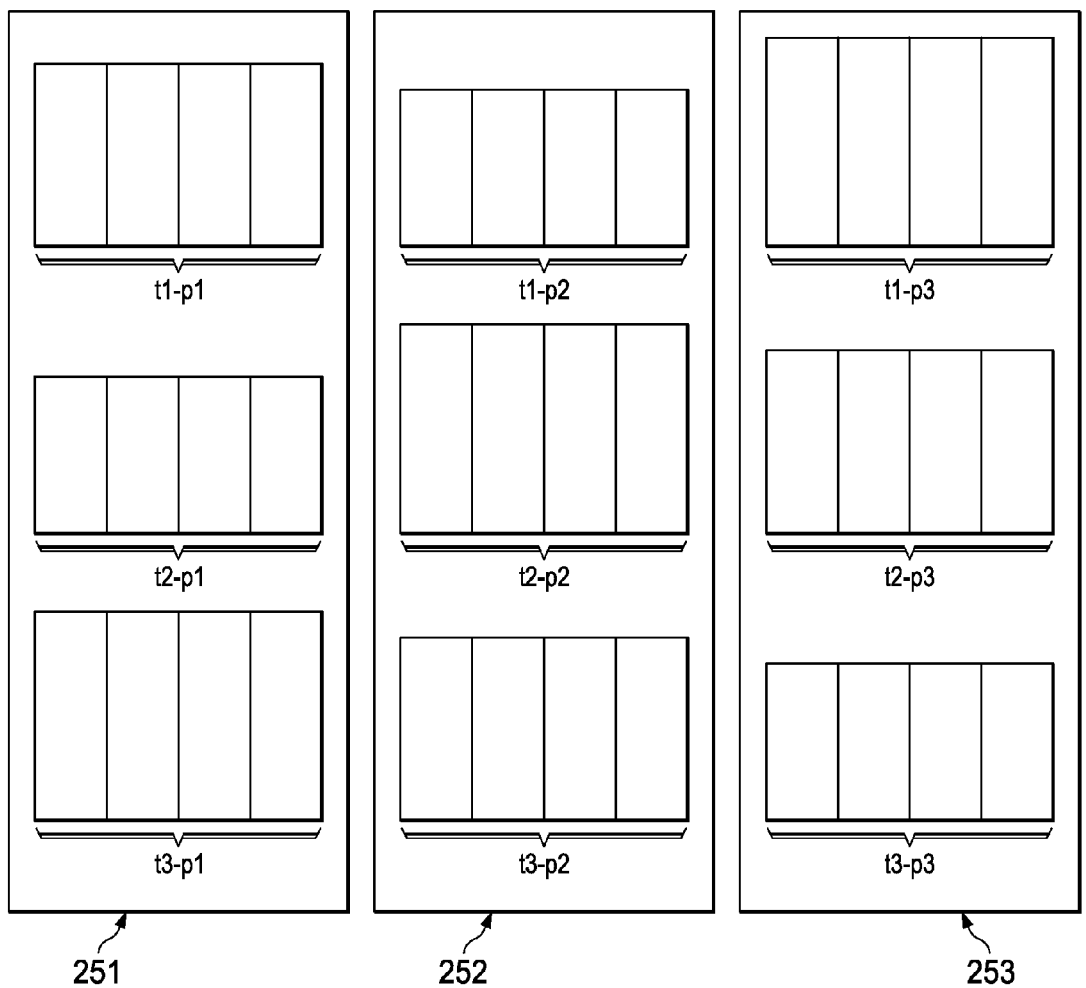
FIG. 2 illustrates a diagram describing how a conventional database is partitioned into an MPP database.

FIG. 2 illustrates an example of how a database 200 is partitioned into an MPP database 250. As shown, the database 200 comprises a first table (t1) 210, a second table (t2) 220, and a third table (t3) 230. The tables 210-230 may differ in size, and may include different numbers of columns. As the tables 210-230 are filled with additional data, the database 200 may become too large for a single processor to efficiently handle. Accordingly, it may be beneficial to partition the database 200 into the MPP database 250. As shown, the MPP database 250 comprises a plurality of partitions 251-253, each of which houses a portion of data obtained from the database 200. While FIG. 2 shows each of the partitions 251-253 including a corresponding portion of each of the tables 210-230, other embodiment MPP architectures may distribute data differently. For instance, the t1 210 could be stored in a single one of the partitions 251-253, or, alternatively, could be distributed across two of partitions 251-253. In any event, it is quite likely that data will be distributed amongst the partitions 251-253 in an un-even/non-uniform fashion.

Traditional query execution flow includes the coordinator receiving a query from a client, compiling it, generating a global execution plan, and sending the global execution plan to each data node. Thereafter, each data node may instantiate one or more segments of the global execution plan, exchange data with one another (if need be), and compute results for the query and return it the coordinator. The coordinator gathers results from data nodes, does the final processing, and returns the query response to the client.

Figure 3:
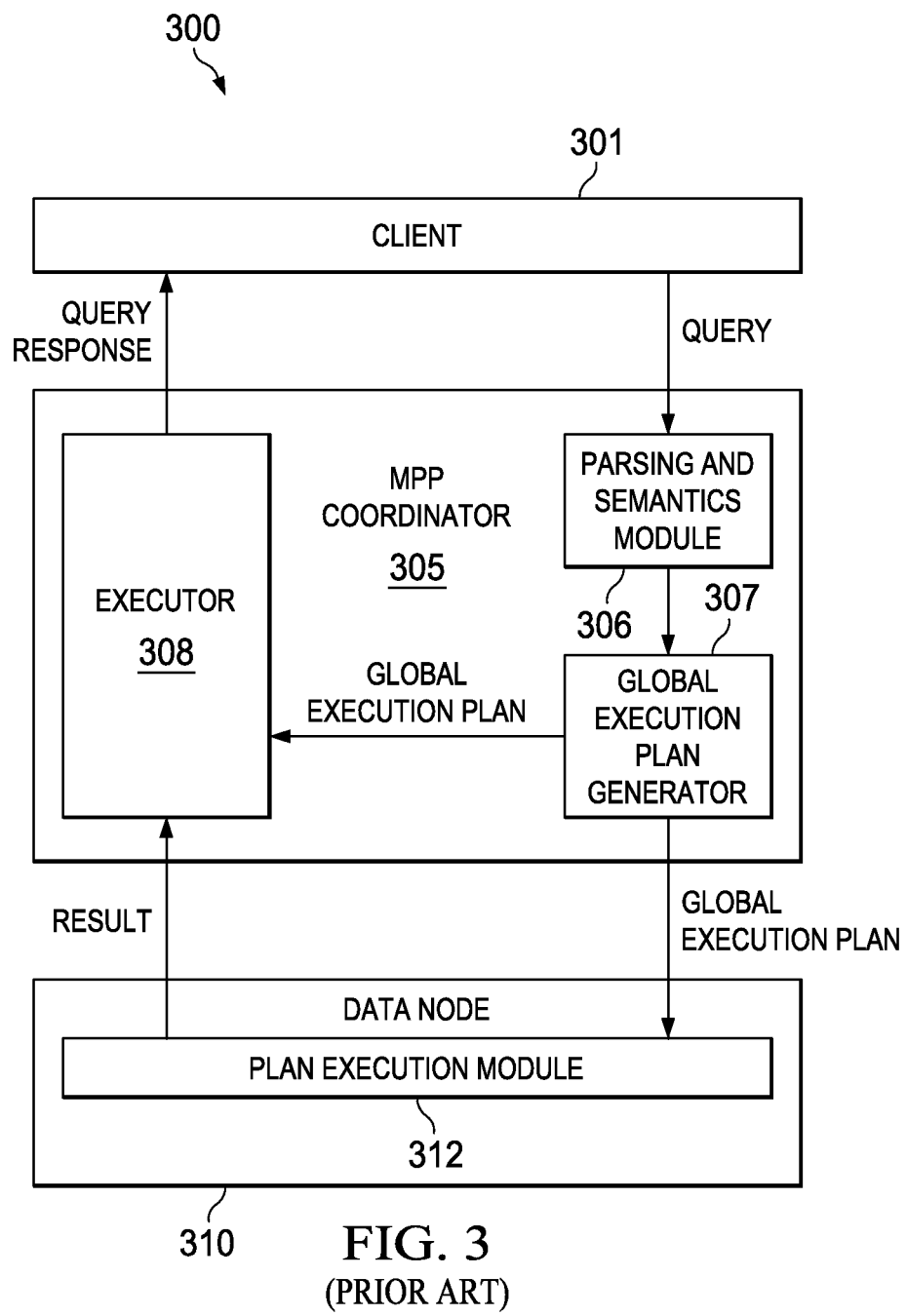
FIG. 3 illustrates a diagram of a conventional MPP database architecture for responding to queries.

FIG. 3 illustrates a diagram of a conventional MPP architecture 300 for responding to queries from a client 301. The MPP architecture 300 includes an MPP coordinator 305 and a data node 310 (other data nodes are omitted for purposes of clarity and concision). The MPP coordinator 305 includes a parsing and semantics module 306 for processing queries, a global execution plan generator 307 for generating a global execution plan, and an executor 308 for gathering/aggregating results and assembling a query response. The parsing and semantics module 306 may receive a query from the client 301, and develop a semantic tree. The semantic tree may be a general outline for responding to the query, and may form the foundation upon which the global execution plan is built. The semantic tree may then be sent to the global execution plan generator 307, which may generate the global execution plan in accordance with a global view of data distribution and resources. More specifically, the global execution plan may be generated under the assumption that data was evenly distributed across the data nodes and/or that the data nodes have unconstrained resources. The global execution plan may then be sent to the executor 308, the data node 310, and other data nodes in the MPP architecture 300.

The data node 310 may include a plan execution module 312 for executing the global execution plan received from the MPP coordinator 305. Executing the global execution plan may include various database processes, such as searching/scanning databases, aggregating results, joining results, interacting with other data nodes of the MPP database to transfer and/or gather results, etc. After generating the result, the data node 310 may transfer the result (directly or indirectly) to the MPP coordinator 305. For instance, the result may be forwarded directly to the MPP coordinator 305, or the result may be indirectly transferred to another data node for further processing (e.g., aggregation with results from other data nodes, etc.) before ultimately being forwarded to the MPP coordinator 305. Upon receiving results from each of the data nodes in the MPP database, the executor 308 may aggregate the results to obtain a query response. The query response may then be returned to the client 301.

Figure 4:
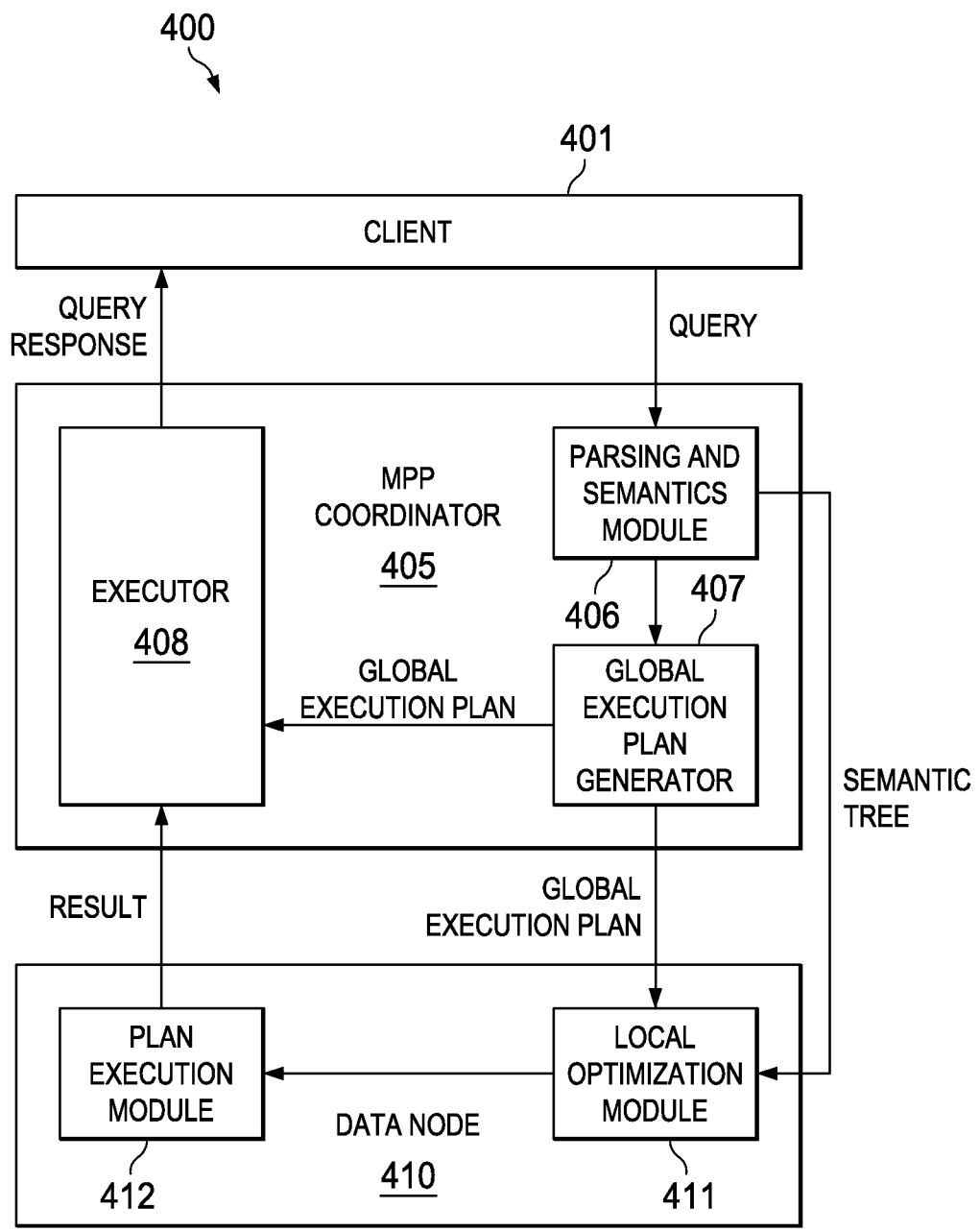
FIG. 4 illustrates a diagram of an embodiment MPP database architecture for responding to queries.

FIG. 4 illustrates a diagram of an embodiment MPP architecture 400 for responding to queries from a client 401. The embodiment MPP architecture 400 includes an MPP coordinator 405, a data node 410, and other data nodes (omitted for purposes of clarity and concision). The MPP coordinator 405 may be configured similarly in some respects to the MPP coordinator 305, except that the MPP coordinator 405 is configured to send the semantic tree as well as the global execution plan to the data node 410. The data node 410 is quite different from the data node 310, in that the data node 410 comprises a local optimization module 411 configured to optimize the execution plan in view of local configuration information native to the data node 410. More specifically, a local execution plan (or local execution plan segments) may be developed in accordance with the semantic tree, and thereafter more efficient of the global and local execution plan or plan-segments may be selected in accordance with a cost evaluation. For instance, if a local plan segment has a lower cost than the corresponding global plan segment, then the local plan segment may be selected for execution.

In embodiments, the local optimization module 411 may use constraints defined by the global execution plan to fortify the semantic tree (or a sub-tree derived therefrom), in order to ensure that said constraints are satisfied. The local optimization module 411 may then send the selected execution plan to the plan execution module 412, which may execute the plan. The plan execution module 412 may thereafter transfer the result (directly or indirectly) to the executor 408 for processing into the query response.

Figure 5:
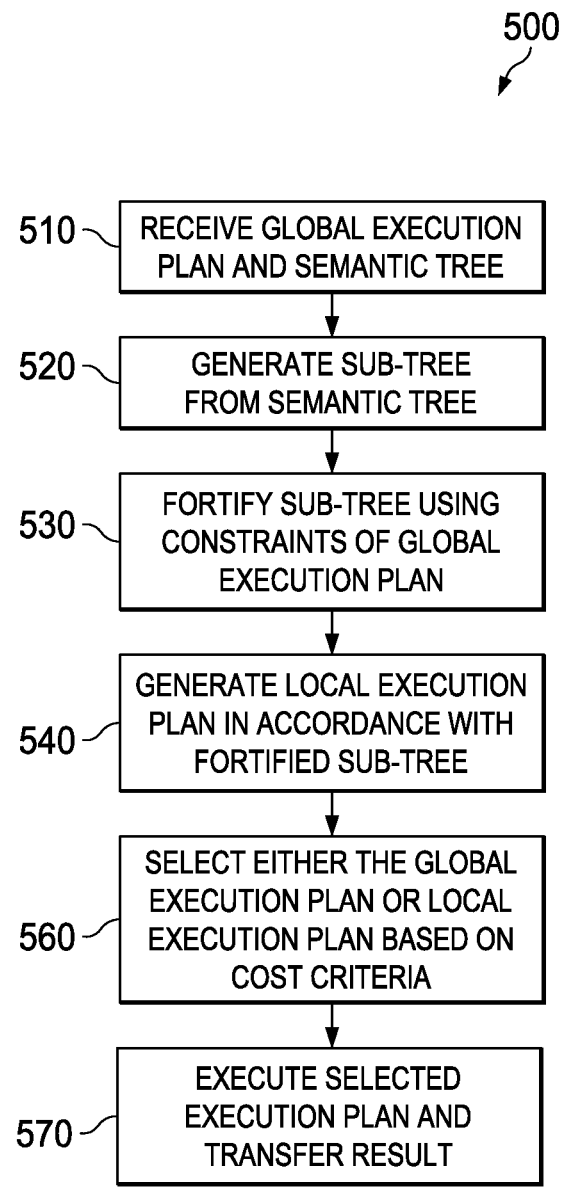
FIG. 5 illustrates a flowchart of a method for optimizing a global execution plan.

FIG. 5 illustrates a method 500 for operating a data node. The method 500 begins at step 510, where a global execution plan and semantic tree are received from the MPP coordinator. Thereafter, the method 500 proceeds to step 520, where a sub-tree is identified from the semantic tree. Next, the method 500 proceeds to step 530, where the sub-tree is fortified using constraints of the global execution plan. Subsequently, the method 500 proceeds to step 540, where a local execution plan is generated in accordance with the fortified sub-tree. Thereafter, the method 500 proceeds to step 550, where one of the global execution plan and the local execution plan is selected based on cost criteria. Next, the method 500 proceeds to step 550, where the selected execution plan is executed to obtain a result, and the result is transferred (directly or indirectly) to the MPP coordinator.

Figure 6:
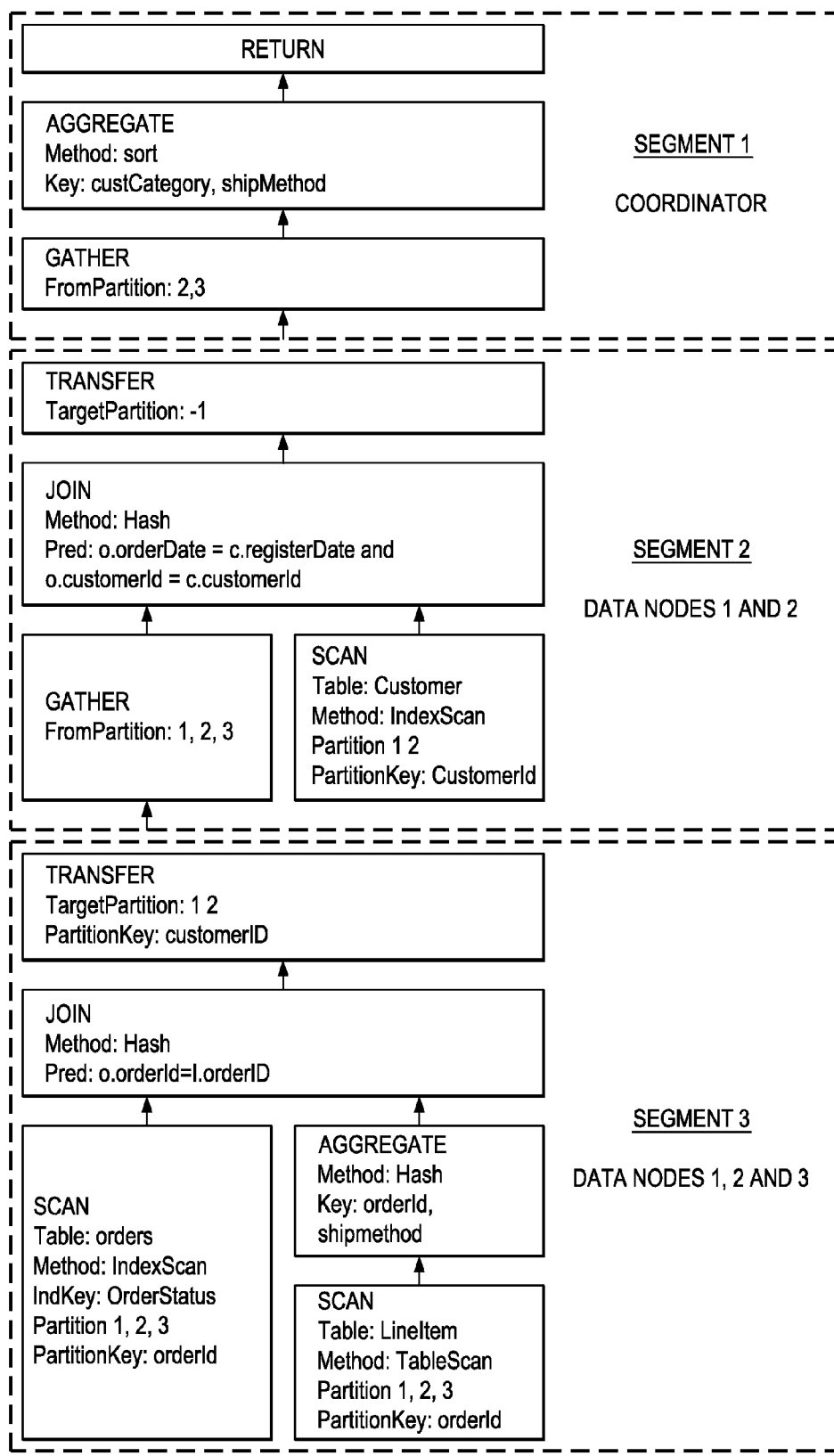
FIG. 6 illustrates a diagram of a query flow for a global execution plan.

FIG. 6 illustrates a query flow 600 of a global execution plan for responding to a query. The MPP database comprises a customer table partitioned between data nodes 1 and 2, and a line item table and order table partitioned amongst data nodes 1, 2, and 3 The first segment is executed by MPP coordinator; the second segment is executed by data nodes 1 and 2, and the third segment is executed by data node 1, 2, and 3. The join result between order and line-item will be repartitioned on customerId before joining with customer table in the second segment. This is accomplished by coupling of the top TRANSFER operator in the third segment and GATHER operator in the second segment. Notably, in the query flow 600, the execution plan for the second segment is identical for nodes 1 and 2, and the execution plan for the third segment is identical for nodes 1, 2, and 3.

Figure 7A:
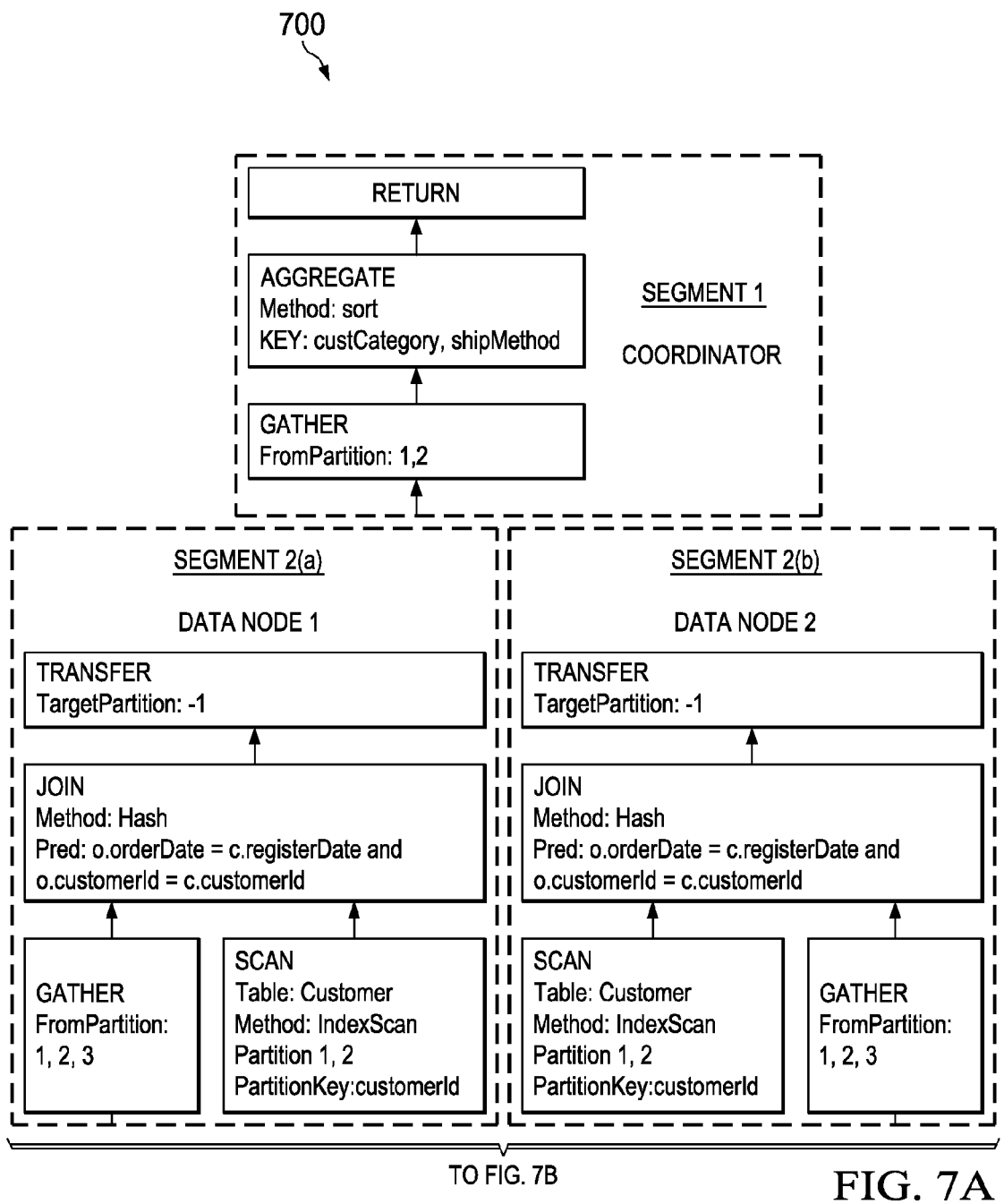
FIGS. 7($a$)-7($b$) illustrate a diagram of a query flow for a locally optimized global execution plan.
Figure 7B:
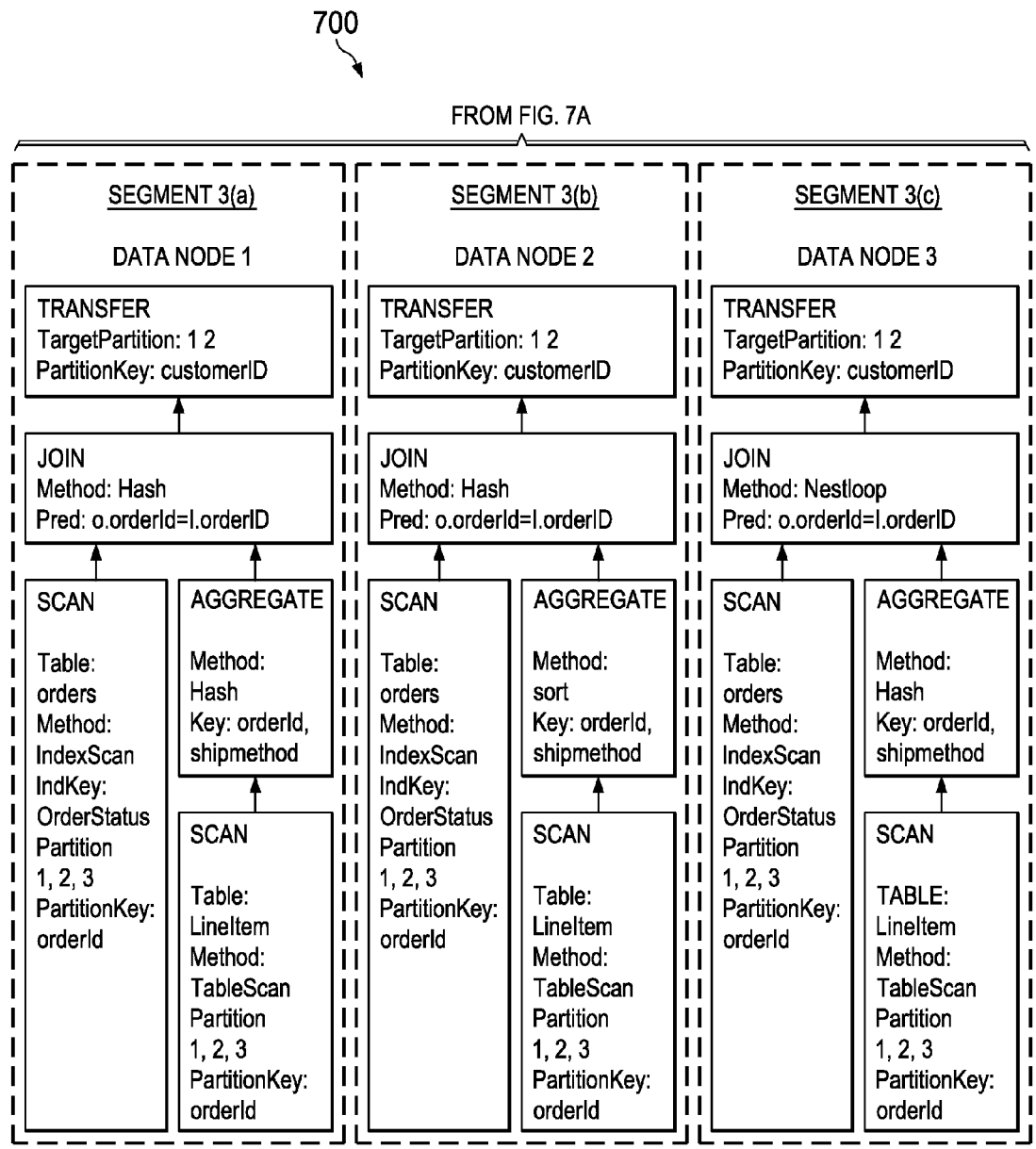

FIG. 7 illustrates a query flow 700 of a locally optimized global execution plan for responding to a query. As shown, the plan segments executed on each data node differ from one another as a result of local optimization. For example, while the second segment on node 1 is the same as the original plan (shown in FIG. 6), the argument order of hash join of the second segment on node 2 is different from the original plan even though the join method is the same. This can be triggered, for example, by the fact the number of qualified rows in customer table on node 3 is significantly less than original estimated, assuming other factors are the same. For the third segment, the plan on node 1 is the same as the original; the plan on node 2 uses different argument order of hash join; and the plan on node 3 uses different join methods completely.

Figure 8:
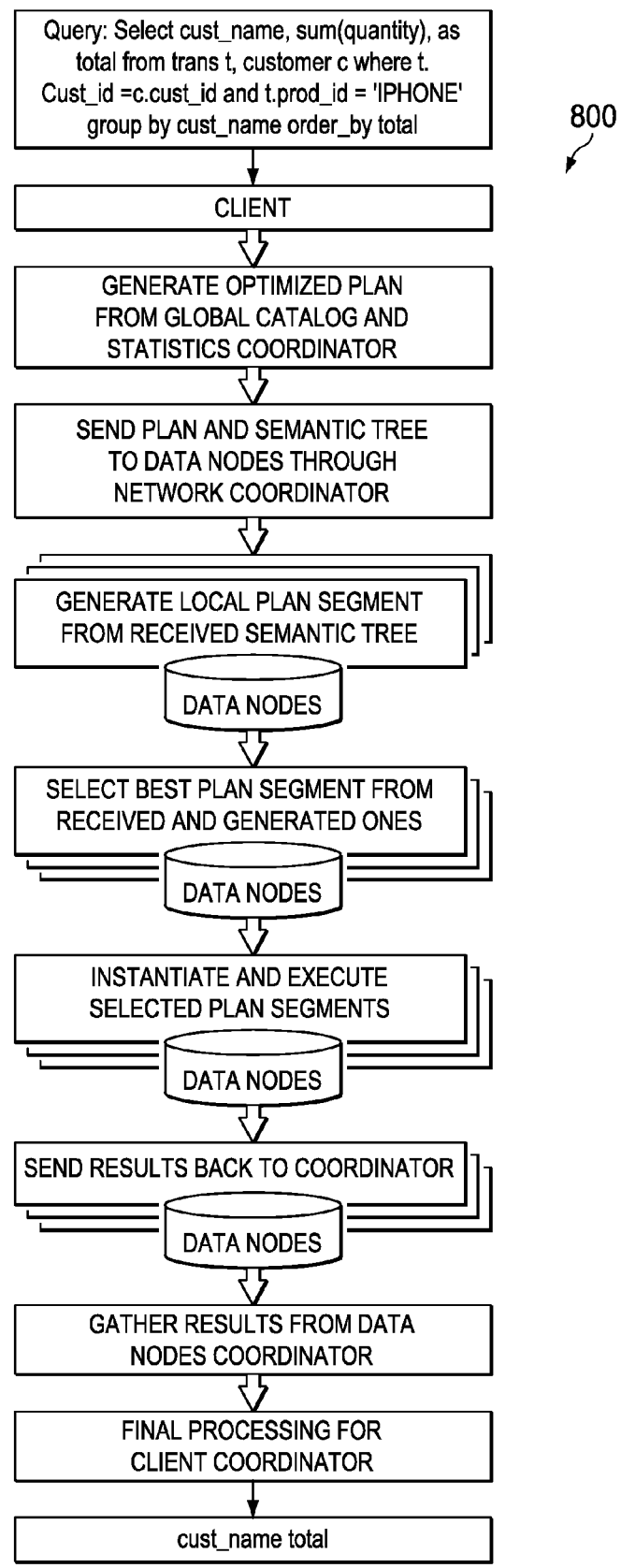
FIG. 8 illustrates a flowchart of a method for processing a query that includes an additional stage of local optimization.

FIG. 8 illustrates a method for processing a query that includes an additional stage of local optimization. As shown, the query plan is received at each data node, after which each data node analyzes each plan segment applicable to itself to see if it can be re-optimized. If so, a new best plan for the segment is selected, instantiated, and executed to compute the query results for the segment. Results will be sent as input to the next segment.

Figure 9:
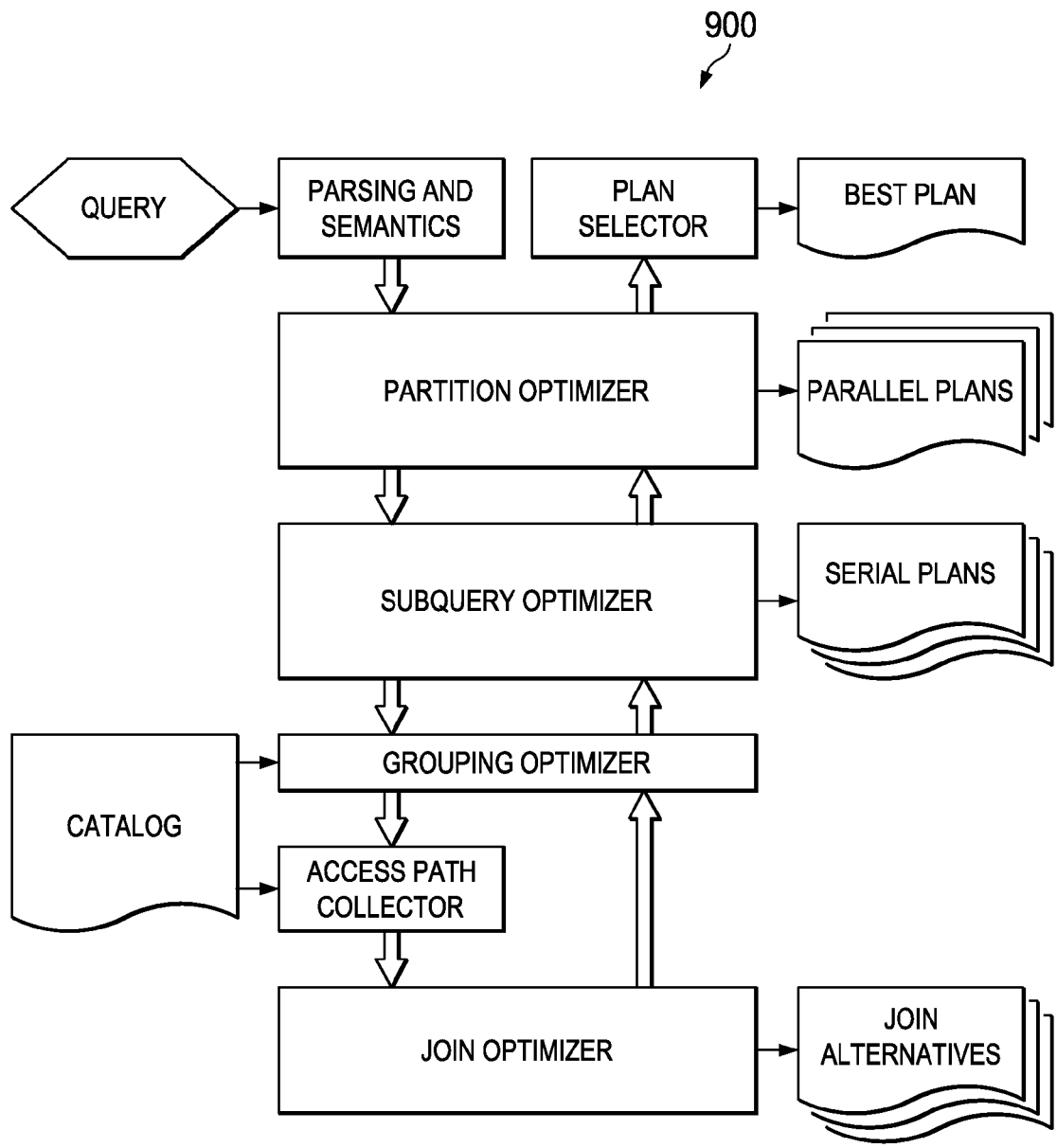
FIG. 9 illustrates a block diagram of a query processing module of an MPP coordinator.

FIG. 9 illustrates an MPP coordinator 900. The main job of the MPP coordinator 900 is to plan the execution strategy of operations that compute the query result. This includes the table access path, index selection, the methods and order of join, grouping and sorting of the results and executing of sub-queries, etc. In a distributed MPP database, the MPP optimizer also considers the location of partitions so that certain operations may be executed in a manner that minimizes data movement between data nodes. The planning process may be achieved through dynamic programming, and may originate from leaves of semantic tree (e.g., a table access). From these leaves, each operation (and alternatives therefor) is generated and saved for each operation. Each level of operations is evaluated until the top of semantic tree is reached. The partition planning kicks in whenever a two stream of data is to be combined or joined. All alternatives are given a cost based on a defined cost model, and the plan with the minimum cost is selected.

Figure 10:
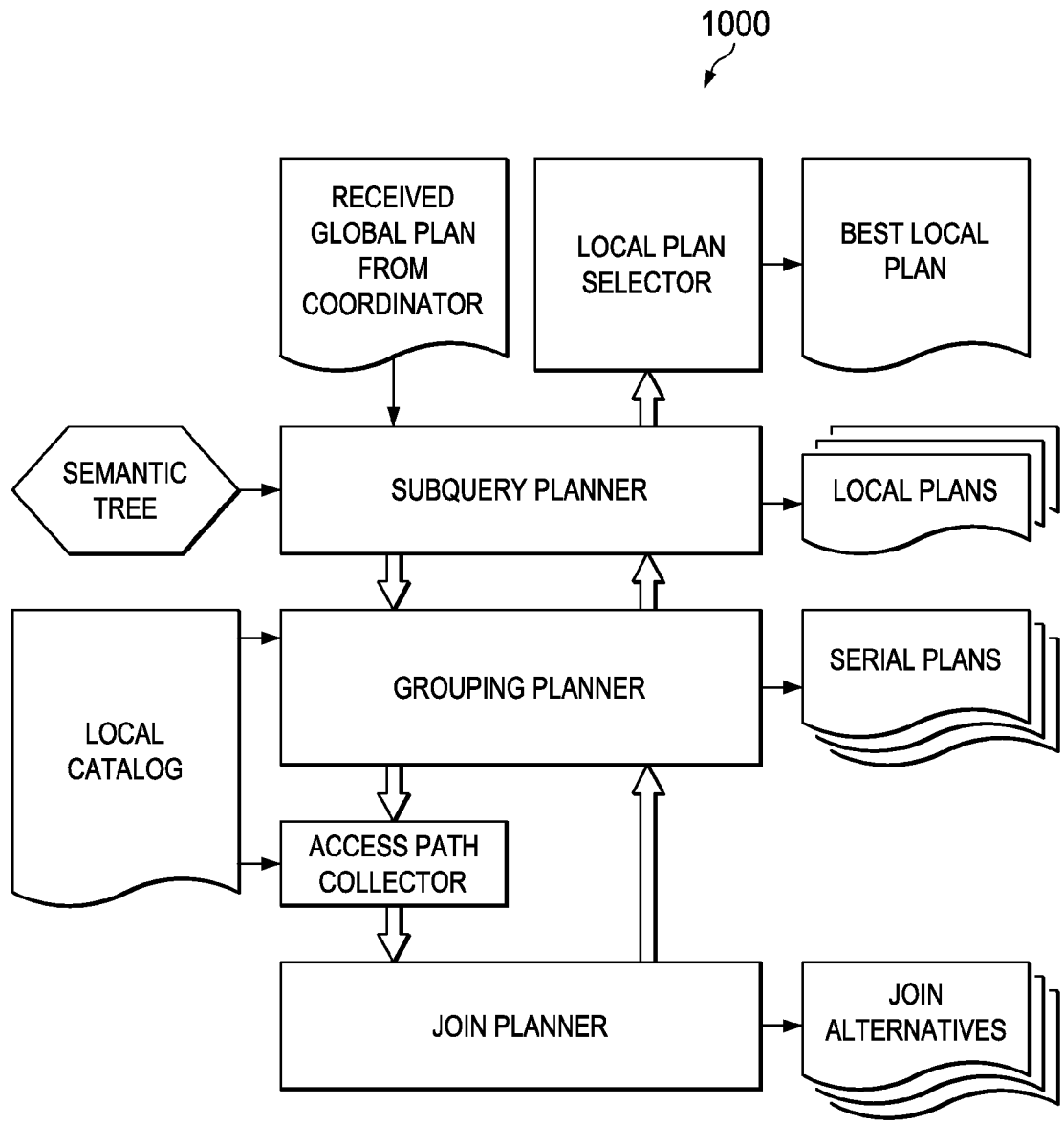
FIG. 10 illustrates a diagram of a local optimizer module of an MPP data node.

FIG. 10 illustrates a local optimizer architecture 1000 that may be included in data nodes to achieve local optimization of the global plan. The local optimizer can be a simplified version of the original optimizer. Notably, the local optimizer architecture 1000 does not contain partition planner as the semantic operations corresponding in the input sub-tree are localized. In some embodiments, the operations corresponding in the input sub-tree are always localized. Also local optimizer architecture 1000 may consider data statistics for local partition and locally resource availability, which may be specified by configuration information native to the data node housing the local optimizer architecture 1000.

Figure 11:
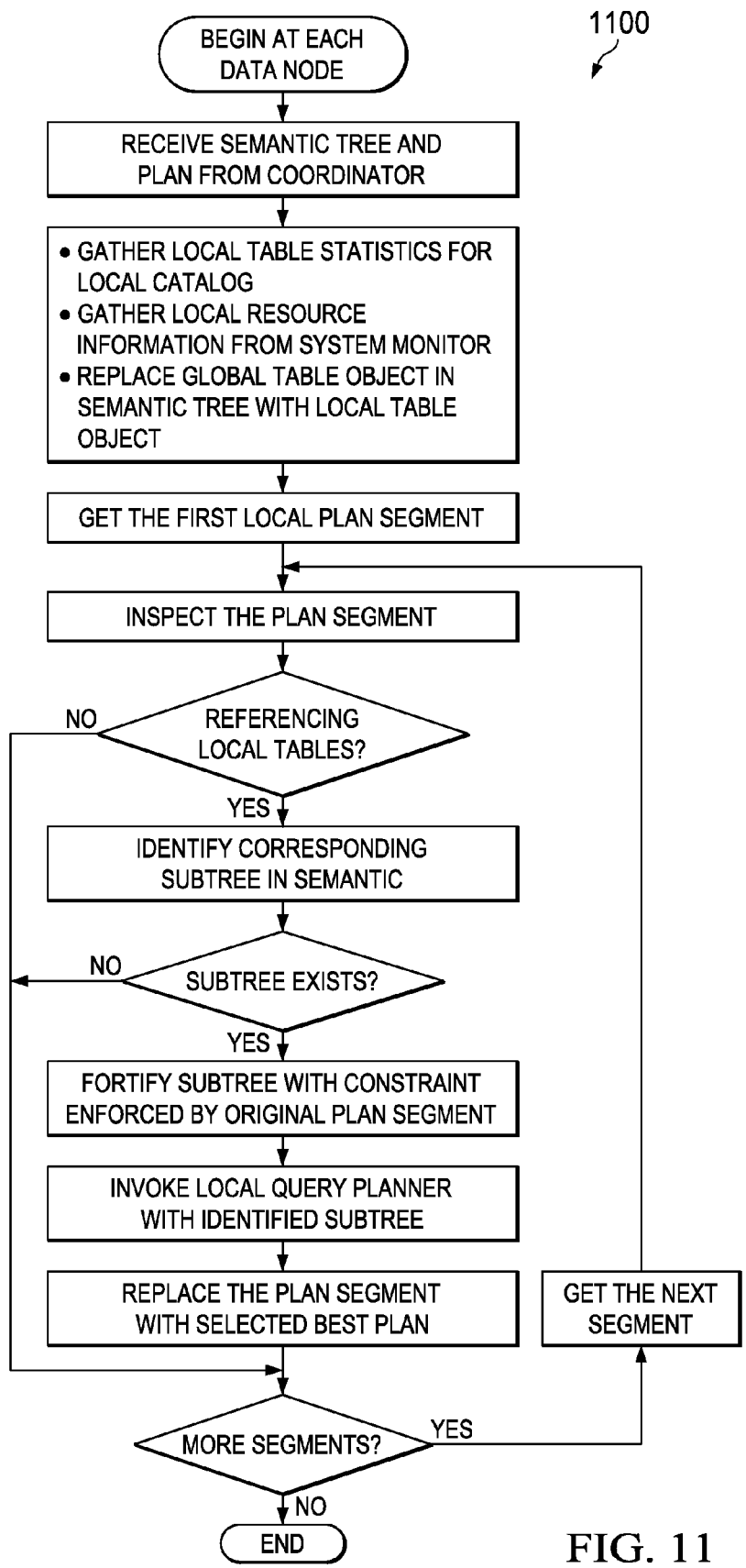
FIG. 11 illustrates a flowchart of a process for locally optimizing a global execution plan at an MPP data node.

FIG. 11 illustrates a process flow 1100 for locally optimizing one or more segments of a global execution plan, as may be performed by a data node. After receiving the global execution plan, the data node will execute the flow of logic to generate an alternative local execution plan that maintains the semantic constraints of the global execution plan. The various segments may be executed in accordance with different partition schema. For each applicable segment, the corresponding data node identifies the sub-tree, and fortified (modifies) the sub-tree to reflect constraints of the global execution plan. Fortification may be an important step to maintain correctness of overall (global) plan, as the output of plan segment may correspond to the input of another plan segment. For planning purpose, those inputs from other segments will be converted into local temp table with cardinality as calculated in the original global plan, so all the joins and other operations are treated as being local to the sub-tree. The constraints may include (but are not limited to) the ordering of result set, the distinctness of result set, the number of rows must be contained in the result set, etc. Thereafter, the local optimizer (in the MPP data node) selects the best plan for the sub-tree. Local optimizer is a simplified version of original optimizer because it does not have to deal with partition planning, and remote operations. The original plan segment is replaced by the best plan selected by the local optimizer, and execution continues with new plan segment for the query.

Figure 12:
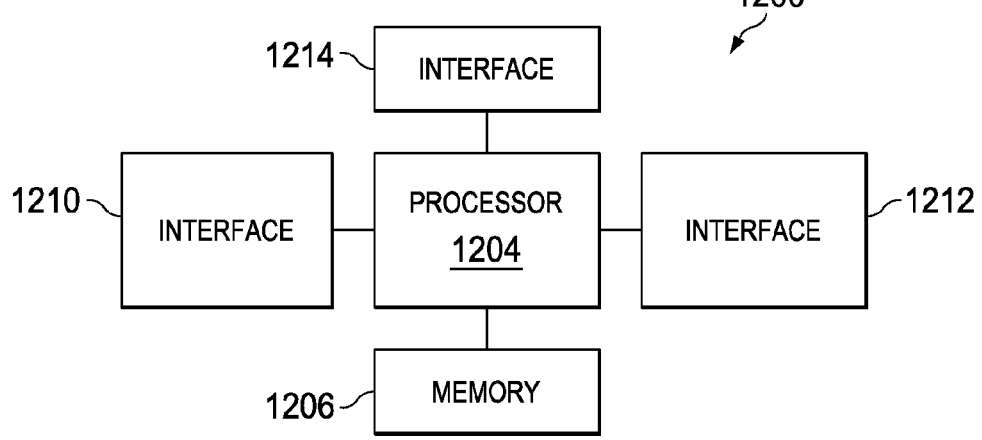
FIG. 12 illustrates a high-level block diagram of an MPP data node.

FIG. 12 illustrates a block diagram of an embodiment of an MPP data node 1200. The MPP data node 1200 may include a processor 1204, a memory 1206, and a plurality of interfaces 1210-1214, which may (or may not) be arranged as shown in FIG. 12. The processor 1204 may be any component capable of performing computations and/or other processing related tasks, and the memory 1206 may be any component capable of storing programming and/or instructions for the processor 1204. The interfaces 1210-1214 may be any component or collection of components that allows the MPP data node 1200 to communicate with other devices, such as neighboring MPP data nodes, the MPP coordinator, etc.

Aspects of this disclosure allow segments of a global execution plan to be optimized locally at each data node in accordance with local configuration information. This allows each data node to customize the execution plan (within semantic constraints) for faster processing of database queries.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for processing queries in a massively parallel processing (MPP) database, the method comprising:

receiving, by an MPP data node, a global execution plan and a semantic tree from an MPP coordinator, the MPP data node being one of a plurality of MPP data nodes in the MPP database, wherein the global execution plan is generated by the MPP coordinator without access to local configuration information native to the MPP data node, and wherein the MPP coordinator is a device that is separate and distinct from the MPP data node;

generating, by the MPP data node, a local execution plan in accordance with the semantic tree and the local configuration information native to the MPP data node, wherein the local execution plan is an alternative to the global execution plan such that one of the local execution plan and the global execution plan is executed by the same MPP data node, wherein generating the local execution plan comprises identifying a sub-tree of the semantic tree, fortifying the sub-tree in accordance with a set of constraints enforced by the global execution plan, and generating the local execution plan in accordance with the fortified sub-tree, the set of constraints enforced by the global execution plan including at least one of an ordering of a result set, a distinctness of the result set, and a number of rows contained in the result set; and selecting one of the global execution plan and the local execution plan for execution by the same MPP data node, wherein the global execution plan is not executed by the MPP node when the local execution plan is selected for execution by the MPP data node, and wherein the local execution plan is not executed by the MPP node when the global execution plan is selected for execution by the MPP data node.

2. The method of claim 1, wherein the execution plan and the semantic tree correspond to a query made by a client.

3. The method of claim 1, wherein selecting either the global execution plan or the local execution plan for execution by the MPP data node comprises:
determining a cost for each of the local execution plan and the global execution plan in accordance with a defined cost model;
selecting the local execution plan when the local execution plan has a lower cost than the global execution plan; and
selecting the global execution plan when the local execution plan has an equal or greater cost than the global execution plan.

4. The method of claim 3, wherein the defined cost model accounts for the local configuration information native to the MPP data node.

5. The method of claim 1, wherein the local configuration information specifies resource constraints of the MPP data node.

6. The method of claim 1, wherein the local configuration information specifies an amount of data stored by the MPP data node, wherein data is non-uniformly distributed in the MPP database such that the amount of data stored by the MPP data node differs from amounts of data stored in other MPP data nodes of the MPP database.

7. The MPP data node of claim 1, wherein the global execution plan includes the ordering of the result set.

8. The MPP data node of claim 1, wherein the global execution plan includes the distinctness of the result set.

9. The MPP data node of claim 1, wherein the global execution plan includes the number of rows contained in the result set.

10. A massively parallel processing (MPP) data node in an MPP database, the MPP data node comprising:
a processor; and
a computer readable storage medium storing programming for execution by the processor, the programming including instructions to:
receive a global execution plan and a semantic tree from an MPP coordinator, the MPP data node being one of a plurality of MPP data nodes in the MPP database, wherein the global execution plan is generated by the MPP coordinator without access to local configuration information native to the MPP data node, and wherein the MPP coordinator is a device that is separate and distinct from the MPP data node;
generate a local execution plan in accordance with the semantic tree and the local configuration information native to the MPP data node, wherein the local execution plan is an alternative to the global execution plan such that one of the local execution plan and the global execution plan is executed by the same MPP data node; and
select one of the global execution plan and the local execution plan for execution by the MPP data node, wherein the global execution plan is not executed by the MPP node when the local execution plan is selected for execution by the MPP data node, wherein the local execution plan is not executed by the MPP node when the global execution plan is selected for execution by the MPP data node, wherein the local configuration information specifies an amount of data stored by the MPP data node, wherein data is non-uniformly distributed in the MPP database such that the amount of data stored by the MPP data node differs from amounts of data stored in other MPP data nodes of the MPP database, and wherein the global execution plan is generated by the MPP coordinator under the assumption that data is uniformly distributed amongst a plurality of MPP data nodes in the MPP database.

11. The MPP data node of claim 10, wherein the instructions to select either the global execution plan or the local execution plan for execution by the MPP data node includes instructions to:
determine a cost for each of the local execution plan and the global execution plan in accordance with a defined cost model;
select the local execution plan when the local execution plan has a lower cost than the global execution plan; and
select the global execution plan when the local execution plan has an equal or greater cost than the global execution plan.

12. The MPP data node of claim 11, wherein the defined cost model accounts for local configuration information native to the MPP data node.

13. The MPP data node of claim 10, wherein the local configuration information specifies resource constraints of the MPP data node.

14. The MPP data node of claim 10, wherein the local configuration information specifies an amount of data stored by the MPP data node, wherein data is non-uniformly distributed in the MPP database such that the amount of data stored by the MPP data node differs from amounts of data stored in other MPP data nodes of the MPP database, wherein the global execution plan is generated by the MPP coordinator under the assumption that data is uniformly distributed amongst a plurality of MPP data nodes in the MPP database.

15. The MPP data node of claim 10, wherein generating the local execution plan comprises:
identifying a sub-tree of the semantic tree;
fortifying the sub-tree in accordance with a set of constraints enforced by the global execution plan; and
generating the local execution plan in accordance with the fortified sub-tree.

16. The MPP data node of claim 15, wherein the set of constraints enforced by the global execution plan comprise at least one of an ordering of a result set, a distinctness of result set, and a number of rows contained in the result set.

17. A method for processing queries in a massively parallel processing (MPP) database, the method comprising:

receiving, by an MPP data node, a global execution plan and a semantic tree from an MPP coordinator, the MPP data node being one of a plurality of MPP data nodes in the MPP database, wherein the global execution plan is generated by the MPP coordinator without access to local configuration information native to the MPP data node, and wherein the MPP coordinator is a device that is separate and distinct from the MPP data node;

generating, by the MPP data node, a local execution plan in accordance with the semantic tree and the local configuration information native to the MPP data node, wherein the local execution plan is an alternative to the global execution plan such that one of the local execution plan and the global execution plan is executed by the same MPP data node; and selecting one of the global execution plan and the local execution plan for execution by the same MPP data node, wherein the global execution plan is not executed by the MPP node when the local execution plan is selected for execution by the MPP data node, and wherein the local execution plan is not executed by the MPP node when the global execution plan is selected for execution by the MPP data node wherein the local configuration information specifies an amount of data stored by the MPP data node, wherein data is non-uniformly distributed in the MPP database such that the amount of data stored by the MPP data node differs from amounts of data stored in other MPP data nodes of the MPP database, and wherein the global execution plan is generated by the MPP coordinator under the assumption that data is uniformly distributed amongst a plurality of MPP data nodes in the MPP database.

18. The method of claim 17, wherein the execution plan and the semantic tree correspond to a query made by a client.

19. The method of claim 17, wherein selecting either the global execution plan or the local execution plan for execution by the MPP data node comprises:
   determining a cost for each of the local execution plan and the global execution plan in accordance with a defined cost model;
   selecting the local execution plan when the local execution plan has a lower cost than the global execution plan; and
   selecting the global execution plan when the local execution plan has an equal or greater cost than the global execution plan.

20. The method of claim 19, wherein the defined cost model accounts for the local configuration information native to the MPP data node.

21. The method of claim 17, wherein the local configuration information specifies resource constraints of the MPP data node.

* * * * *